March 25, 1930.                S. D. SPRONG                1,751,665
                              INSULATING JOINT
                            Filed March 13, 1928
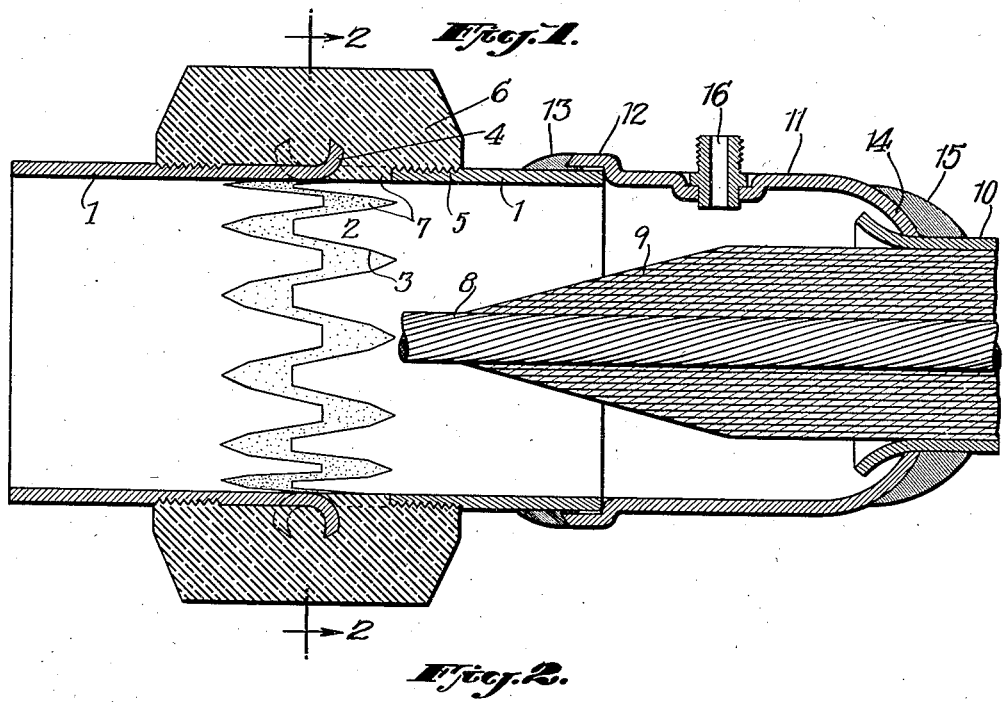
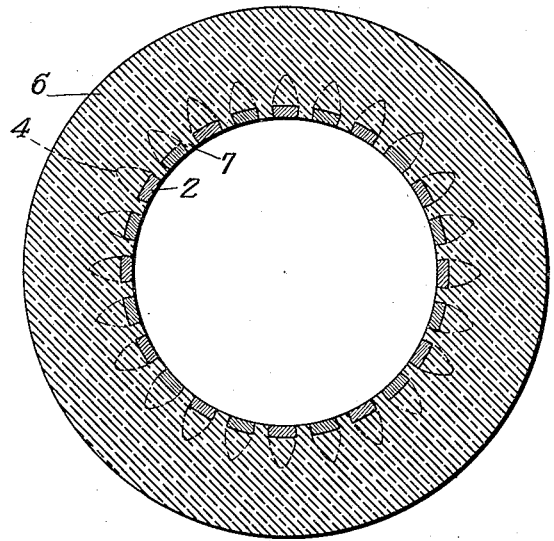
Inventor
SEVERN D. SPRONG.
By his Attorney
D. Anthony Usina Patented Mar. 25, 1930

1,751,665

UNITED STATES PATENT OFFICE

SEVERN D. SPRONG, OF BROOKLYN, NEW YORK, ASSIGNOR TO ENGINEERING PRODUCTS CORPORATION, INC., OF NEW YORK, N. Y., A CORPORATION OF NEW YORK

INSULATING JOINT

Application filed March 13, 1928. Serial No. 261,241.

Systems for transmission of alternating currents generally employ lead covered cables carrying from one to four conductors within one lead sheath. A considerable inductive effect is set up in the sheath, particularly in the case of a single conductor cable, causing a current of greater or less volume to flow in the sheath. Under conditions of heavy current flow in a cable of considerable length currents of objectionable volume may be generated in the lead sheath and tend to flow therein parallel to the cable. Such currents are objectionable for several reasons. They increase the temperature of the lead sheath, and thus the cable as a whole, and diminish the carrying capacity of the cable. They may cause melting of the lead sheath at any point of sufficiently good contact with the earth; with the further danger of causing a spark at such point and a consequent explosion of accumulated gas in the vicinity. To avoid these difficulties the lead sheath is divided into several sections of comparatively short length by means of insulating joints. The electrical isolation of such sections subdivides the current to such low limits as to be practically harmless. The requirements of such a joint are very exacting. My invention provides a joint for this purpose which is proof against leakage caused by either pressure or vacuum therein, which is of materials which will not deteriorate in a moist or gassy atmosphere; which is heat resisting to such an extent that no excess temperature caused by the current in the cable will soften it; and which can be readily installed in connection with the regular cable practice and wiped to the cable sheath without impairing its insulating or mechanical properties. Another important characteristic of my invention is the maintenance of metal around the cable throughout the length of the joint. This is important because the curve of dielectric stress on the cable insulation must be changed as little as possible over the area where the insulation mechanically joins the metal sleeves to form the insulated joint.

The accompanying drawing illustrates an embodiment of the invention.

Fig. 1 is a partial longitudinal section, omitting the details of the cable joint and insulation.

Fig. 2 is a cross-section on the line 2—2 of Fig. 1.

The insulating joint comprises a pair of tubular sections of metal, preferably of brass. Their inner ends are serrated to form teeth 2 and notches 3. The ends 4 of the teeth 2 are bent outward. The teeth of one section enter the notches of the opposite section, leaving a space of zigzag shape between the ends of the two sections. Each section is provided back of the serrated end with V shaped grooves 5 extending around its outer face.

The sections in the position stated have formed about them a ring 6 of insulating material. This, for example, may be of plastic material molded and pressed into shape and having the necessary characteristics of mechanical rigidity, resistance to heat, adhesion to the metal of the sections, mechanical and electrical stability to resist moisture and other fluids encountered in subway systems, and also mechanical and electrical stability under these conditions. A number of such materials are known; such as bakelite, micanite (a mixture of shellac and mica) and colasta. The last material has proved satisfactory in tests under severe requirements and superior to such others as are known of.

The invention is of most importance on high voltage lines and has been tested for as high as 133,000 volts.

The annular ridges 5 give a greater surface contact and mechanical grip between the insulating material and the metal. The outwardly bent ends 4 of the teeth are so deeply embedded in the insulating material as to insure mechanical rigidity and alignment. The bending out of the ends of these teeth also gives an assurance against contact between the two sections. The interlocking of the opposite teeth 2, without contact, provides a nearly uniform potential gradient transversely across the insulation 6 between one section and the other. The insulating material enters the space between the teeth, as indicated at 7, so as to be flush with the inner ends of the sections. If this insulating material extended in a straight line around the structure, it would cause a substantial change at this point in the dielectric stress on the cable insulation. The extent of such change is greatly diminished by breaking this ring of insulating material 6 and providing as large a quantity of metal as possible around the structure at all points, so that there is in effect a substantial quantity of metal surrounding the joint at all points in its length.

The drawing shows one end of the insulating joint connected to the lead sheath. The other end is similarly connected. The conductor 8 is enclosed in insulation 9 over which is the usual lead sheath 10. The brass sections 1 of the insulating joint are extended at their outer ends by the lead sleeve 11. This is extended at one end 12 to go over the brass section and is connected to the latter by a burned or wiped joint 13. The outer end 14 of the lead sheath is drifted down to a smaller diameter to fit the sheath 10 to which it is connected by a wiped joint 15. The usual cable joint for connecting the lead sections electrically and mechanically is omitted, in order to show the insulating joint of the present invention. When the cable sections are jointed and wrapped with insulation as usual and the insulating joint is wiped fast to the cable sheath, the joint is filled with any usual or suitable insulating compounds through the fitting 16 which is afterwards sealed.

Various modifications may be made by those skilled in the art without departure from the invention as defined in the following claims:

What I claim is:

1. An insulating joint for the sheath of an electric cable comprising metal sections with teeth on one section entering notches on the other, the sections being out of contact with each other and being connected by insulating material.

2. An insulating joint for the sheath of an electric cable comprising a pair of tubular sections with indented ends overlapping each other but out of contact, the ends of the teeth being bent outwardly, and plastic material in which said bent ends are embedded and which enters the space between the teeth and is adherent to the sections so as to hold them together while insulating them from each other.

In witness whereof, I have hereunto signed my name.

SEVERN D. SPRONG.